United States Patent [19]
McCandlish et al.

[11] Patent Number: 5,352,269
[45] Date of Patent: Oct. 4, 1994

[54] SPRAY CONVERSION PROCESS FOR THE PRODUCTION OF NANOPHASE COMPOSITE POWDERS

[76] Inventors: Larry E. McCandlish, 262 Lincoln Ave., Highland Park, N.J. 08904; Bernard H. Kear, 10 Campbells Brook, Whitehouse Station, N.J. 08889; Swarn J. Bhatia, 2259 Shawnee Path, Scotch Plains, N.J. 07076

[21] Appl. No.: 734,285

[22] Filed: Jul. 9, 1991

Related U.S. Application Data

[63] Continuation-in-part of Ser. No. 433,742, Nov. 9, 1989, abandoned.

[51] Int. Cl.$^5$ .............................................. B22F 9/26
[52] U.S. Cl. ..................................... 75/351; 75/355; 75/362; 75/366; 423/440
[58] Field of Search .......... 75/338, 351, 355, 362–366; 419/18; 423/440, 447.3

[56] References Cited

U.S. PATENT DOCUMENTS

| | | | |
|---|---|---|---|
| 2,160,670 | 5/1939 | Oswald | 419/58 |
| 2,176,802 | 10/1939 | Romp | 419/58 |
| 3,077,385 | 2/1963 | Robb | 23/208 |
| 3,488,291 | 1/1970 | Hardy et al. | 252/301.1 |
| 3,512,962 | 5/1970 | Holtz | 419/18 |
| 3,932,594 | 1/1976 | Gortsema | 423/440 |
| 4,320,156 | 3/1982 | Oakes et al. | 75/252 |
| 4,579,713 | 4/1986 | Lueth | 419/58 |
| 4,664,899 | 5/1987 | Kimmel et al. | 423/440 |
| 4,851,041 | 7/1989 | Polizzotti et al. | 419/18 |
| 4,915,733 | 4/1990 | Schiitz et al. | 75/228 |
| 5,057,147 | 10/1991 | Shaffer et al. | 419/18 |

FOREIGN PATENT DOCUMENTS

| | | |
|---|---|---|
| 3835728 | 4/1990 | Fed. Rep. of Germany . |
| 3830111 | 3/1992 | Fed. Rep. of Germany . |
| 91-7244 | 5/1991 | World Int. Prop. O. .......... 75/366 |

OTHER PUBLICATIONS

Hackh's Chemical Dictionary, fourth edition, J. Grant, ed., 1969, p. 40.
Gardner et al.; Abstract, pp. 227–232, Precursor Chemistry Effects on Development of Particulate Morphology During Evaporative Decomposition of Solutions.
Halliday et al.: Abstract, pp. 291–301, Thermodynamic Considerations of the Production of Cobalt/Tungsten Carbide Mixture by Direct Gas Phase . . .
R. Ushuima; Powder Metallurgy, vol. 11, No. 4, 1979.

*Primary Examiner*—George Wyszomierski

[57] ABSTRACT

A process is described for the production of composite powders with ultrafine microstructures. The process involves three coordinated steps:
1) preparation and mixing of an appropriate starting solution;
2) spray drying to form a chemically homogeneous precursor powder; and
3) fluid bed thermochemical conversion of the precursor into the desired nanophase composite powder.

Both spray drying and fluid bed conversion are scaleable technologies, and together provide the means for producing bulk quantities of nanophase composite powders at low manufacturing cost. Processing parameters are controlled to ensure maintenance of chemical and microstructural uniformity at the nanoscale (less than 0.1 micron) level.

Spray conversion processing is a versatile technology, which can be applied to a variety of metal—metal (e.g. W—Cu), ceramic-metal (e.g. WC—Co), and ceramic—ceramic (e.g. $Al_2O_3$—$SiO_2$) nanophase composite powders ceramic-metal (e.g. WC—Co), and ceramic—ceramic (e.g. $Al_2O_3$—$SiO_2$) nanophase composite powders.

11 Claims, 8 Drawing Sheets

SPRAY CONVERSION PROCESS FOR THE PRODUCTION OF NANOPHASE COMPOSITE POWDERS

This is a continuation in part of U.S. application Ser. No. 433,742 filed on Nov. 9, 1989, now abandoned.

BACKGROUND OF THE INVENTION

Current research in nanophase materials has been inspired by the discovery that when the scale of the microstructure is less than about 5 nanometers new properties emerge, which are completely unexpected by simple extrapolation of properties found for larger scale microstructures. Another incentive as been the realization that significant improvements in properties can be achieved simply by diminishing the scale of the microstructure, while preserving chemical homogeneity and microstructural uniformity. Thus, the focus of attention has been on the synthesis and processing of materials with ultrafine microstructures in the range 1-100 nanometers. Such structures cannot be produced by conventional casting and mechanical working methods. To overcome these limitations other approaches have been developed, such as rapid solidification, sol gel synthesis, and cryomilling.

According to the Hall-Petch relationship a reduction in the grain size of a material leads to an increase in the yield strength. The quantitative relationship states that the yield strength is inversely proportional to the square root of the grain size. For brittle ceramic materials the fracture strength increases with decreasing grain size in a similar manner. Furthermore, multiphase microcrystalline materials frequently exhibit superplastic properties when deformed in appropriate temperature/strain rate regimes.

When the grain size of a material approaches 2 nanometers, there are just as many atoms encompassed within the grain boundaries as within the grains themselves. Thus, the properties of the materials are strongly influenced by the properties of the grain boundaries. Recent studies have shown striking modifications in the properties of metals when they are in the nanocrystalline state, as shown in Table 1.

TABLE 1

Properties of nanophase metals compared with their crystal counterparts. The percentages in parentheses represents changes from the reference crystal value. After Birringer et al.*

| Property Nanocrystal | Units | Material | Crystal |
|---|---|---|---|
| Thermal Expansion | $10^{-6} K^{-1}$ | Cu | 17 | 31 |

TABLE 1-continued

Properties of nanophase metals compared with their crystal counterparts. The percentages in parentheses represents changes from the reference crystal value. After Birringer et al.*

| Property Nanocrystal | Units | Material | Crystal |
|---|---|---|---|
| (+80%) Density | $g\text{-}cm^{-3}$ | Fe | 7.9 | 6 |
| (−25%) Saturation Magnetization @ 4K | $emu\text{-}g^{-1}$ | Fe | 222 | 130 |
| (−40%) Susceptibility (N/A) | $10^{-6}$ $emu\text{-}Oe^{-1}g^{-1}$ | Sb | −1 | 20 |
| Fracture Stress (+1000%) | $kP\text{-}mm^{-2}$ | Fe (1.8%C) | 50 | 600 |
| Superconducting Tc (+160%) | K | Al | 1.2 | 3.2 |

*Barringer et al., Phys. Lett., A102(1984), 365

In a multiphase material, similar effects can occur but the situation is complicated by the tendency for unlike phases of small dimensions to exhibit crystallographic coherency. One manifestation of this is the appearance of a supermodulus effect in multilayer thin films, where coherency is maintained over large distances in the periodic structure. Physical properties are also changed, for example, quantum well effects in thin film semiconductors and opto-electronic materials.

Chemically synthesized nanophase metal-ceramic composites have many potential applications. These include tool materials, such as cobalt-bonded tungsten carbide (WC—Co), dispersion strengthened materials, such as alumina-strengthened copper ($Al_2O_3$—u), conductor-bonded high Tc superconductors, such as silver-bonded yttrium/barium/copper oxide ($YBa_2Cu_3O_{7-x}$—Ag) and whisker reinforced composites, such as silicon carbide reinforced alumina (SiC—$Al_2O_3$).

Nanophase composites can be prepared from metals or oxides mixed at the nanoscale level. Reduction of mixed oxides would give an intimate dispersion of the more stable oxide in a pure metal. Selective oxidation of a mixed metal would give the same result. Mixtures of metals can be converted to a number of composite systems by heat treatment in appropriate gas mixtures, e.g., $CO$—$CO_2$ for metal-metal carbide cermets, or $NH_3$—$H_2$ for metal-metal nitride cermets.

Although this invention is not limited to a single composite system, for the purposes of describing its essential features we will use the thermochemical processing of nanophase WC-Co composite powders as the primary example. Other notable hardmetal composites to which the present invention would be applicable are listed in Table 2.

TABLE 2

| | Examples of Cemented Carbide Materials** | | |
|---|---|---|---|
| Years | WC Based Cemented Carbides | Years | WC-Free Cemented Carbide |
| 1922–25 | WC-Co* | | |
| 1927 | Graphite Free WC + Co | | |
| 1928–29 | WC + Stellite Binders | 1929–31 | TiC + MoC + Ni,Cr,Mo |
| 1931 | WC + TiC + Co* | 1930–31 | Tac + Ni,Co |
| | WC + TaC(VC,NbC) + Co | 1931 | TiC + Cr,Mo,W,Ni,Co* |
| 1932 | WC + TiC + (TaNb)C + Co | 1931 | TiC + TaC + Co |
| 1938 | WC + $Cr_3C_2$ + Co | 1938 | TiC + VC + Ni,Fe |
| | | 1944 | TiC,NbC + Ni,Co |
| | | 1948–50 | TiC (Mo2C, TaC) + Ni, Co, Cr |
| | | 1949 | TiC + VC + NbC + $Mo_2C$ + Ni |

TABLE 2-continued

Examples of Cemented Carbide Materials**

| Years | WC Based Cemented Carbides | Years | WC-Free Cemented |
|---|---|---|---|
| 1951 | WC + Ni | 1952–81 | TiC + Heat Treatable Binder |
| 1956 | WC + TiC + Ta(Nb)C + $Cr_3C_2$ + Co | | |
| 1959 | WC + TiC + HfC + Co | | |
| 1965 | HIP | 1965–70 | TiC + Mo2C + Ni,Mo |
| 1966 | Submicron WC-Co | | |
| 1968–69 | WC + TiC + (TaNb)C + HfC + Co | 1968–70 | TiMoC + Ni,Mo,Cr |
| 1969–80 | Coated Carbides Tools* (C-5 Substrates)* | | |
| 1975 | Cast Carbide | | |
| 1976–Present | Coated Carbide Tools on Tailored Substrates | 1976 | (W,Mo)C + Co |

*Critical Development
**References:
1. R. Kieffer and F. Benesovsky: 'Hartmetalle'; 1965, Wein, New Yor, Springer-Verlag.
2. K.J.A. Brookes: 'World directory and handbook of hardmetals', 2 ed.; 1979, London, Engineer's Digest.
3. R. Kieffer ad P. Ettmayer: Chem.-Ing.-Tech. 1974, 46.843
4. H.E. Exner: 'International Metals Reviews'

The traditional method of making WC—Co cemented carbides is by crushing, grinding, blending and consolidation of the constituent powders. Thus, the microstructural scale can be no smaller than the size of the milled powders, typically 1–10 microns in diameter. Using a new chemical synthesis method, pioneered at Exxon and Rutgers as disclosed in pending U.S. application Ser. No. 053,267, see also R. S. Polizzotti, L. E. McCandlish, Solid State Ionics, 32/33, 795 (1989), the constituent metallic elements are premixed at the molecular level, thereby permitting control of chemical and microstructural uniformity on the submicron scale. Table 3 illustrates the essential differences between the traditional powder metallurgy method and the new chemical synthesis method for making WC—Co powder. As shown, the chemical synthesis method provides a more direct route for making the composite powder.

SUMMARY OF THE INVENTION

The overall processing scheme of spray conversion processing involves 1) preparation and mixing of an appropriate starting solution, 2) precipitation of a homogeneous precursor powder, and 3) thermochemical conversion of the precursor into the desired nanophase WC—Co composite powder.

TABLE 3—OLD VS. NEW METHOD OF MAKING WC—Co POWDER

A. Conventional Powder Metallurgy Method:
1. React W with C at 1400°–1600° C. to form WC
2. Crush and mill WC to size
3. Mix WC and Co powders
4. Ball mill with paraffin lubricant
5. Compact WC—Co powder to green strength
6. Presinter in $H_2$ to strength and dewax
7. Liquid phase sinter at 1400° C.

B. New thermochemical Synthesis Method:
1. Prepare and mix an appropriate starting solution.
2. Precipitate and dry a fine homogeneous precursor powder from the starting solution.
3. React precursor powder in controlled activity environment to form desired nanophase composite powder.

In practice, we have found that spray drying is the most versatile method for making the precursor powder. An attractive feature of the process is that rapid vaporization of solvent accompanied by rapid precipitation of solute yields chemically homogeneous spherical particles, even from complex starting solutions. Thus, control of precursor powder composition is achieved simply by adjusting the composition of the starting solution. After spray drying, controlled gas-solid reaction in a fluid bed reactor has proved to be the most suitable method of converting the precursor into the final nanophase composite powder.

In the spray conversion processing of nanophase WC—Co powders the determinative factors are 1) selection and mixing of soluble sources of W and Co so that they form a homogeneous solution; 2) rapid precipitation of solute from solvent to form a chemically homogeneous precursor powder, with amorphous, microcrystalline or mixed structure by atomized-droplet drying (spray drying, calcining or roasting); and 3) reduction of the precursor powder with a reducing gas followed by carburization in $CO/CO_2$ at fixed carbon and oxygen activities in a fluid bed reactor to form biphasic particles of nanophase WC—Co. The finest microstructures can be realized in the last step of the process by minimizing conversion time at the reaction temperature. Details of the substantial processing parameters for this case are presented in the section on specific examples.

WC—Co powders are used mainly to fabricate components for metal cutting or rock drilling applications, and for wear parts. Hardfacings are produced by spray consolidation methods, such as plasma spraying, plasma transferred arc deposition and, more recently, hypersonic jet spray deposition. Cutting tools and wear parts are made by cold compaction in presses or by extension, followed by liquid phase sintering. Recently, there has been interest in net shape processing by powder injection molding. In principle, all of these techniques may be used to consolidate nanophase WC—Co powders, provided that the thermal transient in the liquid state is so brief that coarsening of the phases is minimized.

DETAILED DESCRIPTION OF THE PROCESS

Figure 1:
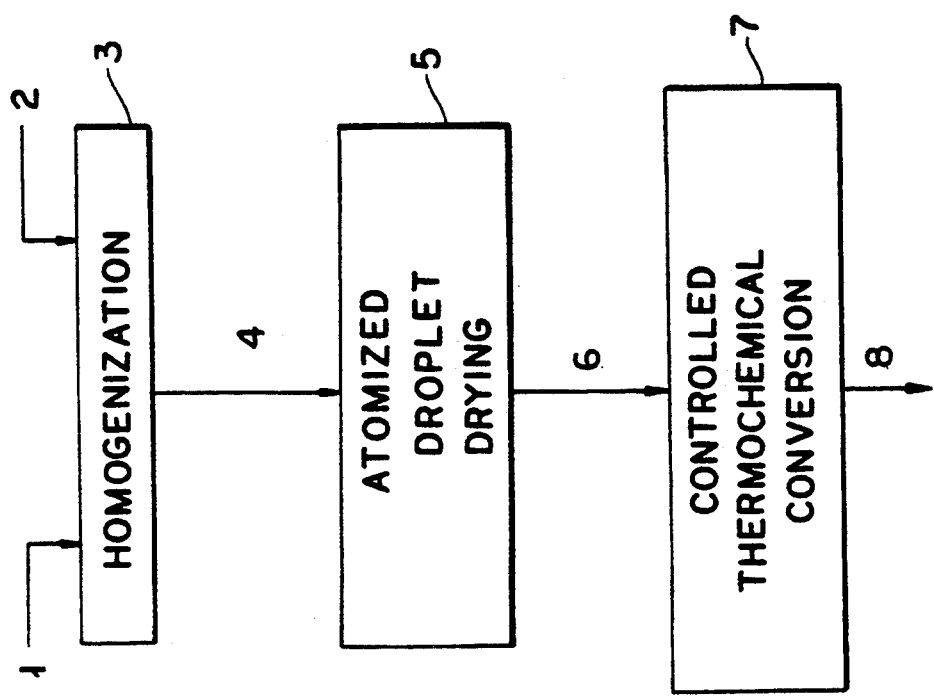
FIG. 1 is a flow sheet showing the process steps of the generic spray conversion process.

Referring to FIG. 1, precursor chemicals, 1, which define the composition of the eventual product, are dissolved in the solvent, 2, which need not be an aqueous solvent. In the homogenization step, 3, the precursor chemicals and the solvent are vigorously mixed to yield a solution, 4, which is completely homogeneous on a molecular level.

In atomized droplet drying, 5, the solvent is evaporated with sufficient speed that the components of the homogeneous solution are precipitated as a homogeneous solid precursor powder 6. The fact that this solid need not be crystalline demonstrates that the rapid drying does in fact trap eventual product atoms in a solid that would decompose into distinct stable phases if the solvent were evaporated slowly. The atomization required for atomized droplet drying may be achieved by spray drying, ultrasonic atomization or other methods yet to be developed.

Controlled thermochemical conversion, 7, of the homogeneous precursor powder is best conducted at the lowest possible temperature to minimize microstructural coarsening in the final composite particles, 8. Thermochemical conversion has been accomplished with the highest degree of success in a high temperature fluidized bed reactor.

Figure 2:
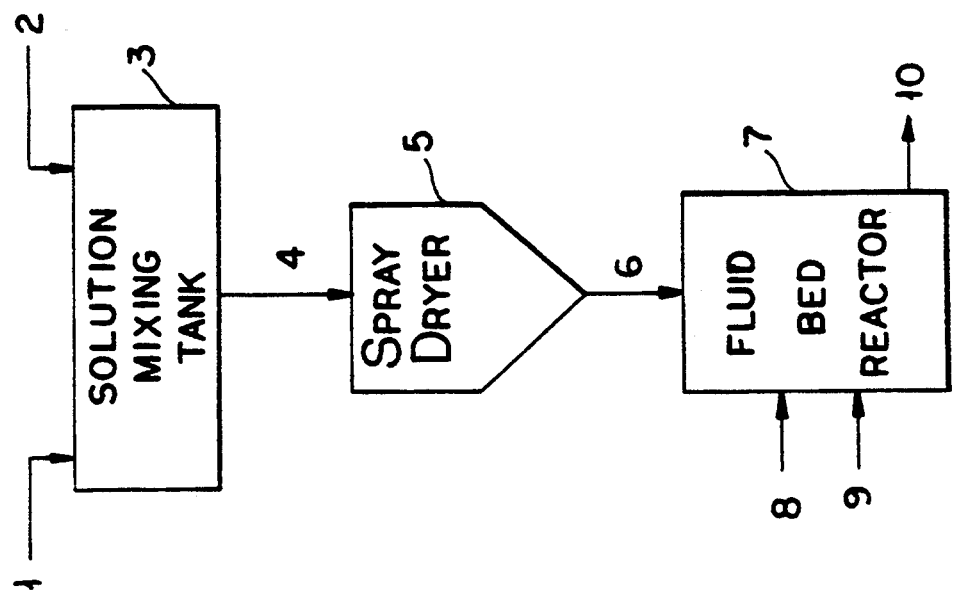
FIG. 2 is a flow sheet showing the process steps of the spray conversion process as it applies to the production of nanophase cobalt bonded tungsten carbide composite powder.

With reference to FIG. 2, the following specific process steps are employed in the production of nanophase cobalt bonded tungsten carbide composition powder. The precursor chemicals, 1, can be cobaltous chloride (CoCl$_2$·6H$_2$O), cobaltous nitrate Co(NO$_3$)$_2$·6H$_2$O), cobaltous acetate (Co(CH$_3$COO)$_2$4H$_2$O), ammonium metatungstate. (NH$_4$)$_6$(H$_2$W$_{12}$O$_{40}$)·4H$_2$O), tris (ethylenediamine) cobalt tungstate (Co(en)$_3$WO$_4$) or tungstic acid (H$_2$WO$_4$) in ammonium hydroxide (NH$_4$OH), chosen depending upon the desired chemical composition of the final cermet product. The solvent, 2, is water in the present embodiment of the process.

Solution mixing, 3, is accomplished in a suitable mixing tank with vigorous agitation. The resultant homogeneous cobalt/tungsten solution, 4, is used as feed for the spray dryer, 5. In the spray dryer, the solvent is evaporated with such rapidity that the micro-sized product particles, 6, retain the fine-scale mixing of the cobalt and tungsten.

In the fluid bed reactor, 7, the powder product from spray drying is first reduced to a nano-dispersed mixture of cobalt and tungsten by contacting with a fluidizing gas stream, 8, consisting of a mixture of hydrogen (H$_2$) and nitrogen (N$_2$). The nano-dispersed mixture is finally converted to a nanophase cobalt—tungsten carbide cermet, 10, by contacting with a second fluidizing gas stream, 9, consisting of a mixture of carbon monoxide and carbon dioxide (CO/CO2). For example, in the case of nanophase WC—Co, it is necessary to fix the carbon activity in the range of about 0.3 to 0.99 at 1000° C. since if the activity is too low (e.g., <0.3) the eta phase, which is M$_6$C, will form. If it is too high (1.0), then free carbon will form. Furthermore, in cases where very low carbon activities are required (e.g. M$_6$C—Co composite powder), it is necessary to carefully adjust the oxygen activity to preclude the formation of oxide phases. Some device, such as a zirconia-based oxygen sensor or infrared CO/CO$_2$ spectrophotometric sensor, is very useful for monitoring and controlling gas flow rates because of the criticality of carbon and oxygen activities. See FIG. 3.

Figure 3:
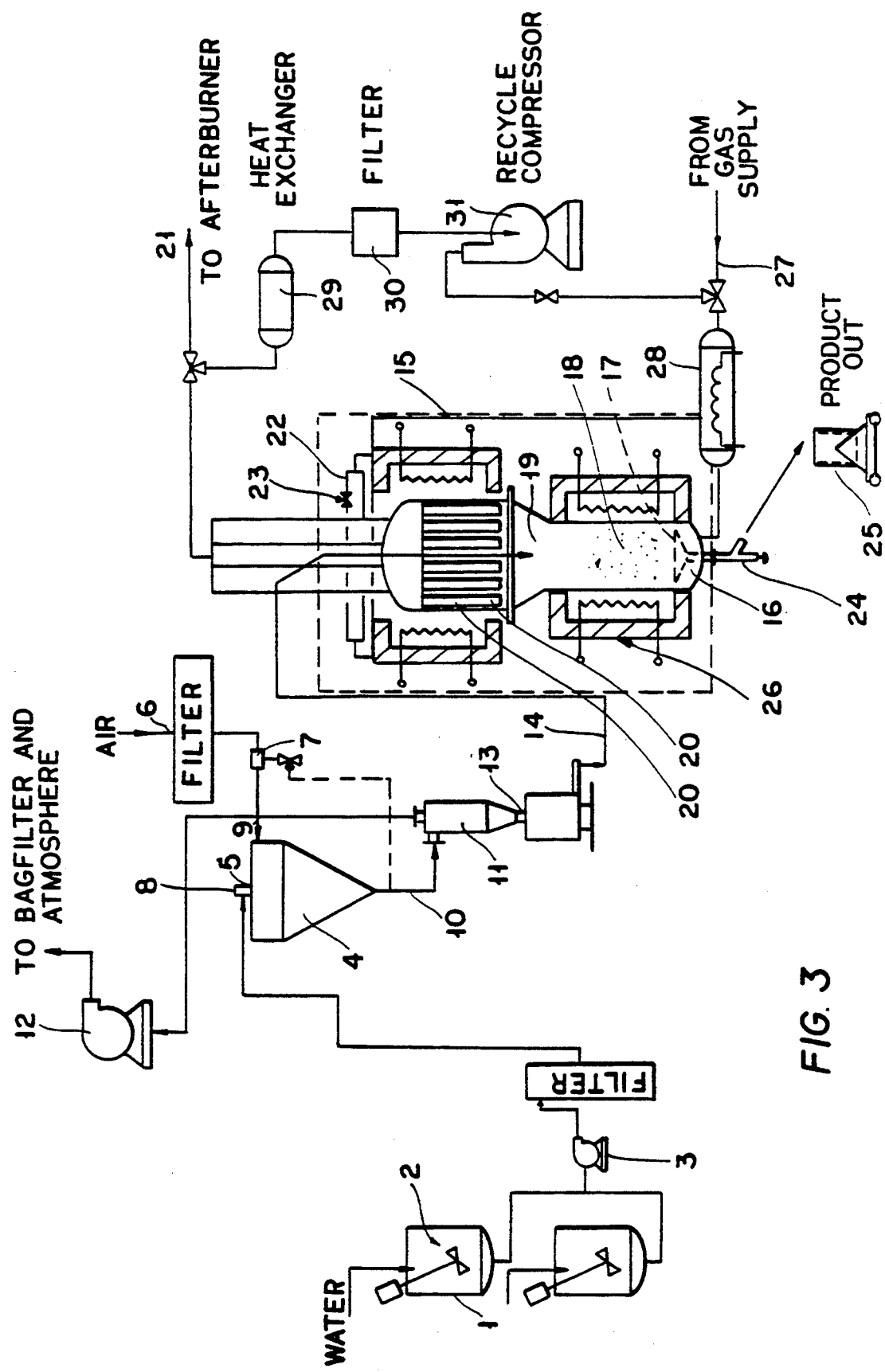
FIG. 3 is a schematic of the integrated process facilities.

Referring to FIG. 3, using an agitated mix tank, 1, a solution of precursor in solvent, 2, is made to the required concentration. Using liquid pump, 3, the solution is fed to the spray drying system at a controlled feed rate.

The spray drying system consists of drying chamber, 4, atomizing nozzle, 5, ambient drying air feed duct, 6, ambient air heater, 7, and compressed air feeder to the nozzle, 8. The liquid feed of precursor in solution is fed into the atomizing nozzle, where it is atomized by the combination of nozzle geometry and compressed air into uniform finely divided droplets of liquid solution. The droplets fall through the drying chamber in the presence of the heated ambient drying air which enters the drying chamber through feed inlet, 9.

The liquid droplets are subjected to evaporation of the solvent while falling through the drying chamber and leave as a uniform finely divided powder through the bottom discharge line, 10, with the drying air. The solids are separated from the drying air in the cyclone collector, 11, where the separated air is exhausted by the main blower, 12, to the atmosphere—typically through dust recovery equipment to prevent discharge of dust not separated in the cyclone collector, 11.

The finely divided solids are discharged from cyclone collector, 11, through product discharge lock, 13, into pneumatic transport duct, 14, to the fluid bed reactor, 15. One batch of the spray dried material is fed to reactor, 15, for each reaction cycle.

Reactor, 15, is equipped with a gas plenum chamber, 16, which is the feed volume for the various reaction gases, a gas distributor plate, 17, which forms the top of the plenum chamber, 16, and serves to distribute the reactant gases into the fluidized bed of finely divided solids, 18. The gases discharging from the fluidized bed pass through the reactor freeboard volume, 19, and then through porous filter elements, 20, which filter any entrained finely divided solids from the discharging gases. The discharging gases are then passed through an afterburner, 21, where they are oxidized prior to discharge to the atmosphere.

The filter elements, 20, are periodically cleaned by reverse flowing of blowback gas from blowback line, 22 using a cycle timed valve, 23.

When the reaction is completed, the fluid bed product is discharged from the reactor through bottom valve, 24, and then to the product cooler, 25.

During reactions, the temperature of solids in the reactor is controlled using heating jacket, 26, which can be electrically heated or fuel fired.

Fluidizing and reactant gases are supplied to the system from a pressurized source of the gas through supply line, 27, through heater, 28, to the plenum chamber 16.

Preparation of Starting Solutions

Compositions of WC—Co of commercial interest contain 3 to 25 weight per cent cobalt (Ref. 3). This range of compositions can be obtained from solution mixtures wherein the Co/W ratio is varied from 0.102 to 1. Appropriate aqueous solutions may be prepared from cobalt tris(ethylenediamine) tungstate=Co(en)$_3$WO$_4$ (where en=ethylenediamine), tungstic acid=H$_2$WO$_4$, ammonium metatungstate=AMT=$(NH_4)_6(H_2W_{12}O_{40})\cdot 4H_2O$, and cobaltous chloride=CoCl$_2$.

Starting solutions for spray drying were prepared from mixtures of soluble compounds. Solution A, a source of both W and Co, was prepared by dissolving Co(en)$_3$WO$_4$ in water. Solution B, a source of W alone, was prepared by dissolving H$_2$WO$_4$ in aqueous NH$_4$OH. Solution C was prepared by dissolving AMT and CoCl$_2$ in water.

The Co/W ratio was adjusted to the desired values of 1.0, 0.63, 0.21, and 0.1 by mixing appropriate quantities of solutions A and B. The starting solutions were spray dried in a laboratory spray dryer, which could be equipped with either rotary or pressure atomizers. After thermochemical conversion of the precursor powders, the resulting nanophase WC—Co powders had respectively 23, 15, 6, and 3 weight percent cobalt binder phase. The ratio in solution C was fixed at 0.37, which yields 10% cobalt in the WC—Co composite powder.

Precipitation of Precursor Powders

A prerequisite for the thermochemical synthesis of nanophase WC—Co is a precursor powder in which W and Co are mixed at the molecular level, such as in the compound Co(en)$_3$WO$_4$, which yields WC—23%Co after reductive decomposition and carburization. See U.S. patent application Ser. No. 053,267. Other compositions can be obtained from solution mixtures of AMT and CoCl$_2$. The challenge in this latter case is to form a powder particle without phase separation during precipitation from solution. This may be accomplished by rapid spray drying of the solution mixture in a hot gas stream. Experience has shown that the resulting spherical powders are chemically homogeneous, with amorphous, microcrystalline or mixed (microduplex) structure, depending on the W/Co ratio in the initial solution (see L. E. McCandlish, B. H. Kear, B. K. Kim, L. W. Wu, 'Metastable Nanocrystalline Carbides in Chemically Synthesized W—Co—C Ternary Alloys', in *Multicomponent Ultrafine Microstructures*, Materials Research Society Symposium Proceedings Volume 132, 67, (1989) L. E. McCandlish et al.).

Atomization technique and feed properties exert a strong influence on particle size distribution, bulk density, and morphology of the dried powder. Several operational variables associated with atomization and drying offer means of altering the product characteristics. The most important variables are atomization energy, feed solution properties, feed rate, air flow rate, and gas temperature.

The characteristics of the spray drying process are reasonably well understood, (see K. Masters, *Spray Drying*, 2nd ed., John Wiley & Sons, New York, N.Y. (1967). When the droplets of the spray make contact with the drying air, rapid evaporation occurs from the saturated vapor film that forms at the droplet surface. Evaporation takes place in two stages. Initially there is sufficient moisture within the droplet to replenish that lost at the surface. Evaporation proceeds at a constant rate as along as diffusion of moisture from within the droplet occurs, so as to maintain a saturated surface condition. A critical point in spray drying is achieved when a dried shell forms at the droplet surface. Evaporation then depends upon the diffusion rate of moisture through the surface shell. As the thickness of the shell increases with time there is a corresponding decrease in the evaporation rate. This stage in the drying process is called the falling rate or second stage of drying. Since evaporation is an endothermic process, the droplet surface remains cool until evaporation is complete even though the gas stream can be quite hot.

Particle morphology and distribution can be influenced by the drying rate. Some materials expand on drying, others collapse, fracture or disintegrate, leading to porous irregularly shaped particles. Others remain a constant spherical shape, yielding hollow particles, or if accompanied by contraction, denser particles.

Thermochemical Conversion of Precursor Powders

There are limitations on the amount of powder that can be thermochemically processed in a fixed bed reactor, because of inherent difficulties in maintaining a uniform temperature and gas percolation rate throughout the powder bed. Typically, only a few grams of material can be processed in a single run. To overcome these limitations, we have adopted a fluid bed reactor for thermochemical processing of the precursor powders.

Fluidization involves the levitation of solid particles in a flowing gas stream. The gross circulation of particles in the bed, the uniform gas flow about each particle, and the uniform bed temperature provide a constant gas-solid environment for the control of chemical reactions in the bed. Thus, a fluid bed reactor is ideal for thermochemical conversion of precursor powders. Furthermore, fluid bed processing is a proven, scaleable technology.

During fluidization the bed maintains a high heat transfer rate, which is maximized at about twice the incipient fluidization velocity, i.e. the minimum velocity necessary to suspend the particles in the fluidized state. The enhanced heat transfer in the bed is caused primarily by particle circulation within the bed. Rising gas bubbles create particle agitation and mass flow of particles throughout the bed. Even so, the gases flow through the reactor approximately as a plug despite significant mixing. The gas velocity can be increased to 2-5 times the incipient velocity before significant particle entrainment and reduced heat transfer occur. The small pressure drop through the fluidized bed remains essentially constant in the dense bed regime where fluidization occurs without particle entrainment.

Figure 4:
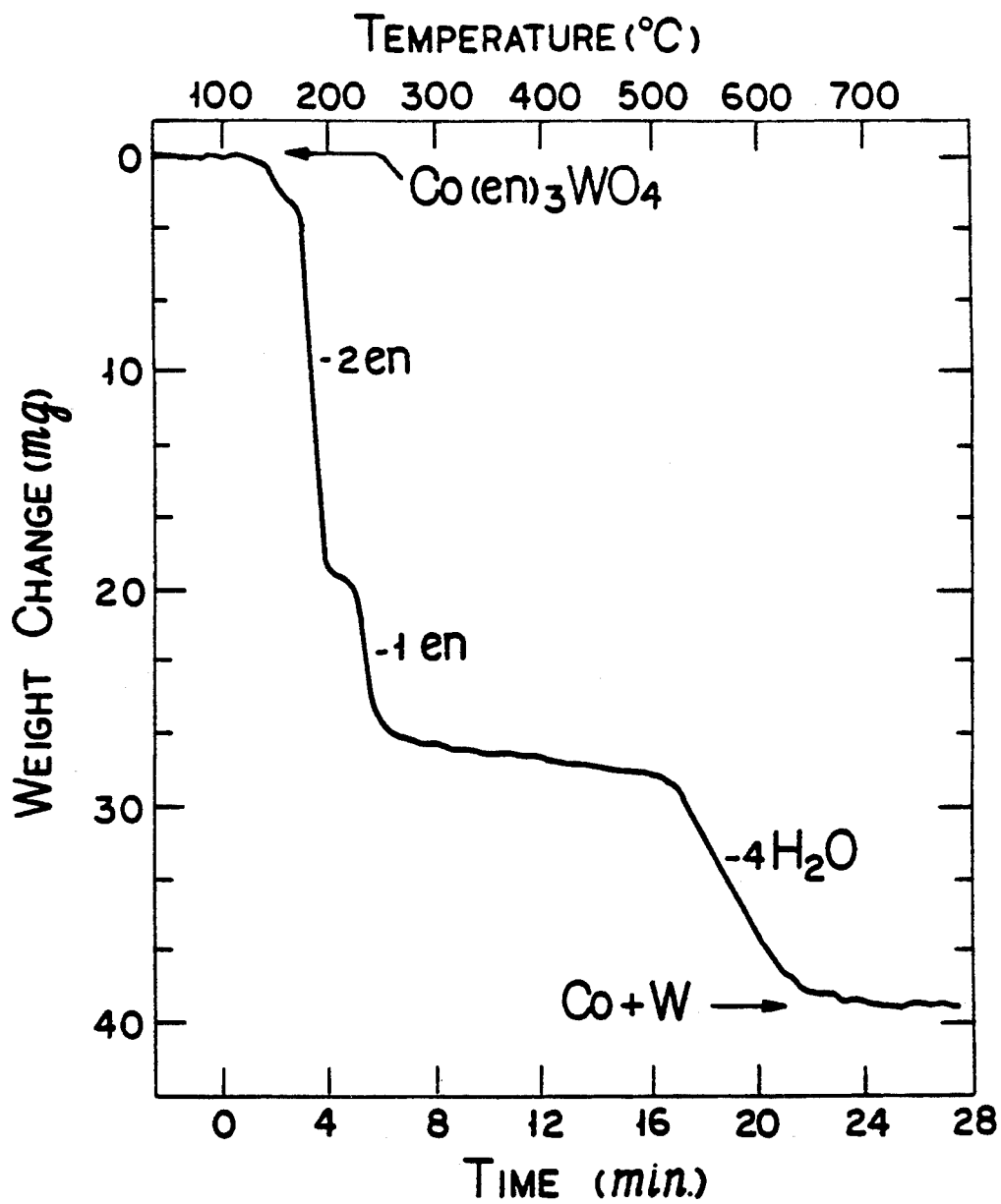
FIG. 4 is plot showing the conversion to the reactive intermediate as a function of temperature, time, and weight change.
Figure 5:
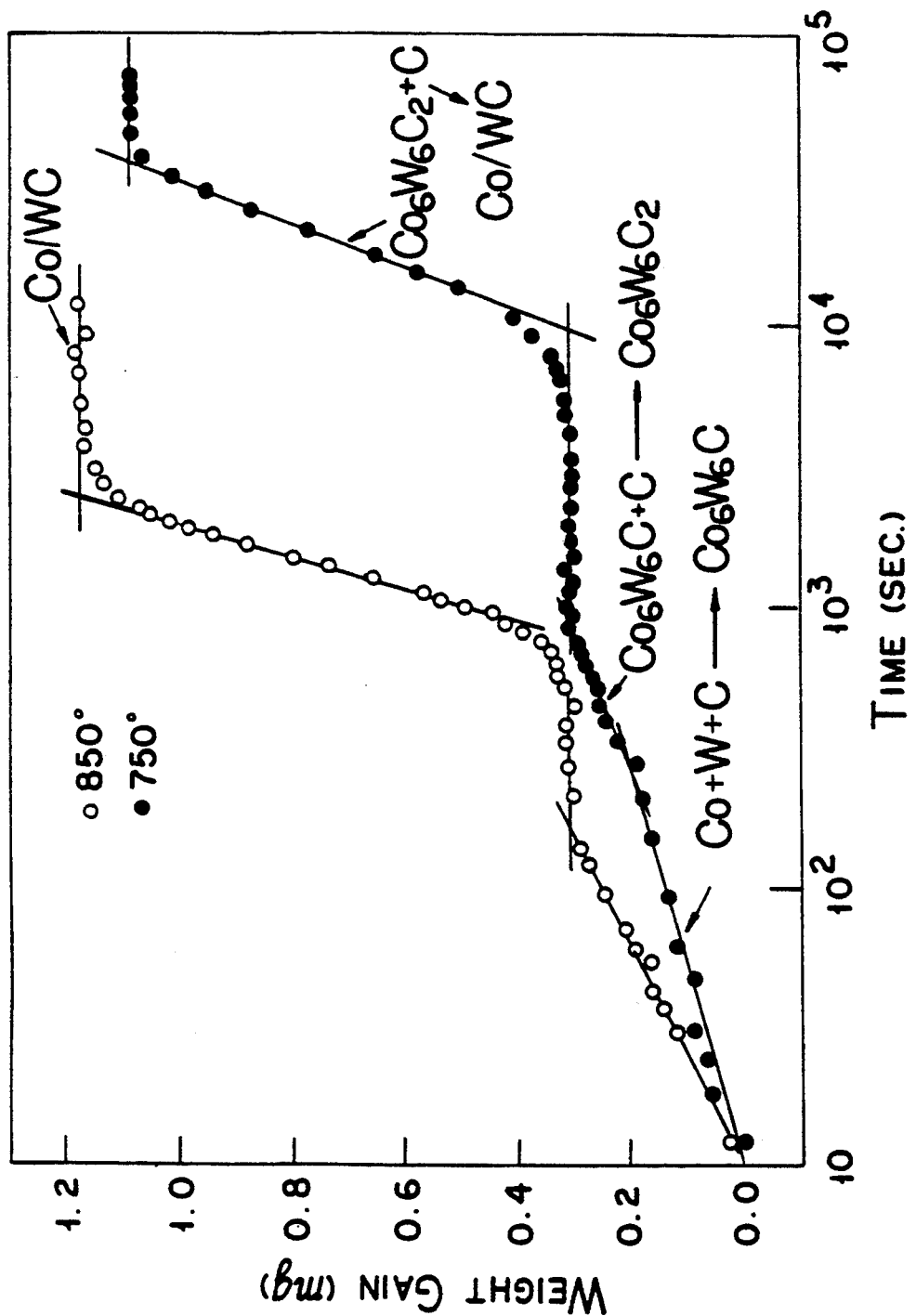
FIG. 5 is a plot showing the reaction pathway and kinetics of the conversion of the intermediate to the WC—Co composite.
Figure 6B:
FIGS. 6A through 6D are micrographs of the microstructures before and after the reduction and carburization of the Co(en)$_3$WO$_4$/H$_2$WO$_4$ powders.
Figure 6A:
Figure 6D:
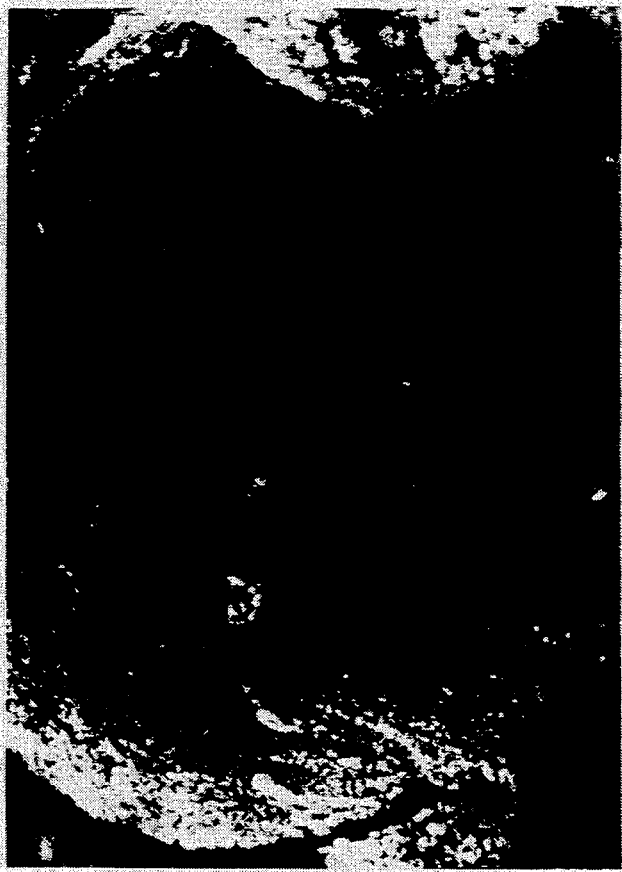
Figure 6C:
Figure 7:
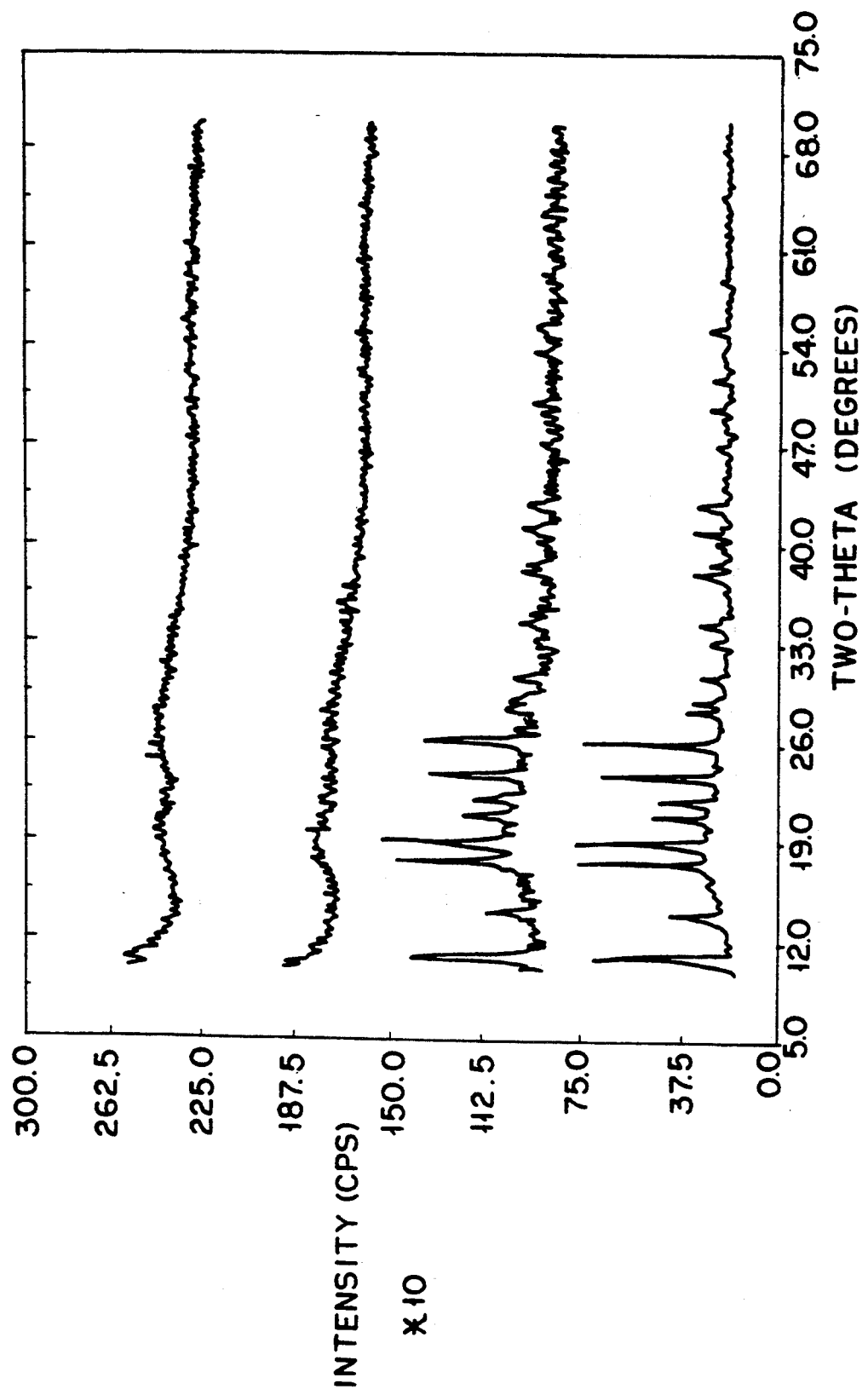
FIG. 7 is a series of x-ray diffraction patterns obtained from spray dried Co(en)$_3$ WO$_4$—H$_2$WO$_4$ powders. From top to bottom, the Co/W ratios are 0.1, 0.2, 0.6, and 1.0.

Controlled gas-solid reactions in a fluid bed reactor require control of the gas composition and temperature. For example, in the preparation of WC—Co from crystalline Co(en)$_3$WO$_4$, the conversion is generally carried out in two steps. First, the precursor powder is reduced to a mixed metal powder (Co+W) in flowing Ar/H$_2$ or N$_2$/H$_2$, FIG. 4, and then the resulting intermediate is carburized in flowing CO/CO$_2$ of fixed carbon activity to form, in this case the desired nanophase Wc—Co powder, FIG. 5. In this case at a carbon activity of 0.95 and a pressure of 900 torr, conversion of mixed metal (Co+W) powder particles to metal-metal carbide (Co+WC) powder particles is brought about by fixing the activity ($a_c$) of the fluidizing gas phase:

$$a_c = [(P_{CO})^2/(P_{CO_2})]K_{eq}$$

where $P_{co2}$ are CO and $CO_2$ gas partial pressures respectively, and $K_{eq}$ is the equilibrium constant for the disproportionation reaction $$2\ CO = CO_2 + C$$

at the conversion temperature. Because diffusion distances in the nanoporous (Co+W) particles are short, the particles quickly absorb carbon and W reacts to form WC. Since the solid phase and the gas phase are allowed to come to equilibrium, the final carbon activity in the particles is equal to the fixed carbon activity of the $CO/CO_2$ gas. In order to insure that the reaction product does not contain either free carbon (C) or etaphase ($Co_3W_3C$), it is necessary to fix the gas phase carbon activity at a value less than 1, but greater than the carbon activity of the three phase field (Co+WC+$Co_3W_3C$) in the Co—W—C ternary phase diagram. The latter activity can be calculated from the following equation (T. D. Halliday, F. H. Hayes and F. R. Sale, in: Industrial Uses of the Thermochemical Data, ed. T. I. Barry, Chemical Society of London, (1980) pp. 291-300):

$$\log_{10} a_c = -2655\ T^{-1} + 1.112$$

where T is the conversion temperature in degrees Kelvin.

The time needed to reach equilibrium can be established by following the reaction progress, at the desired carbon activity and conversion temperature, in a controlled atmosphere thermal gravimetric analyzer (TGA). We have found that such TGA data accurately predicts the conversion kinetics in a fluid bed reactor.

Integrated Manufacturing Technology

The proper integration of solution preparation, spray drying, and fluid bed conversion is essential for the large-scale production of WC—Co powders with controlled composition and nanoscale microstructure. Starting the spray conversion process by forming a liquid solution insures mixing of the constituents at the molecular level. The spray drying and thermochemical conversion steps then provide the means of retaining a remnant of the initial molecular mixing as a nanostructure within the final powder product. The essential elements of the integrated spray conversion process are depicted diagrammatically in FIG. 3.

SPECIFIC EXAMPLES

Example 1

WC—23%Co from crystalline Co(en)$_3$WO$_4$ precursor powders.

An aqueous solution of CoCl$_2$ was combined with a solution of H$_2$WO$_4$ in ethylenediamine to precipitate crystalline Co(en)$_3$WO$_4$. Low concentrations of the reactants in these solutions produce hexagonal rods (20×100 microns) while high concentrations produced flat plates (20×5×1 microns).

The hexagonal-shaped powder particles were readily fluidized at gas velocities in the range 10–40 ft/min. At 35 ft/min, the fluid bed expanded in volume by about 60% which corresponds to an effective bed density of 0.33 g/cc. The corresponding values at 15 ft/min are 30% and 0.44 g/cc.

Fluidization of the smaller plate-shaped powder particles was more difficult, and required the assistance of mechanical stirring or mixing of the precursor powder with 80 mesh alumina (Al$_2$O$_3$) in a 1:5 ratio. In the latter case, the fluidization velocity range was 25–35 ft/min and at 30 ft/min the bed volume expanded by 40% to yield an effective bed density of 1.14 g/cc.

The crystalline Co(en)$_3$WO$_4$ powders were converted in a fluid bed reactor using a two-step reduction/carburization sequence in Ar/10%H$^2$ and CO/CO$_2$ at a carbon activity of 0.9 at 800° C. and 900° C. for 18 hours and 5 hours respectively. For the case of the plate-shaped powder the final WC—Co particles were magnetically separated from the alumina particles. In both cases the final powder particles were biphasic, nanophase and pseudomophic with the original precursor powder particles (FIG. 6).

When Co(en)$_3$WO$_4$ solution is spray dried the resulting microcrystalline particles are spherical, and after fluid bed conversion to WC—Co, have microstructures that are identical to those obtained from the single crystal particles (FIG. 6).

Example 2

WC—Co from amorphous/microcrystalline Co(en)$_3$WO$_4$ precursor powders.

Use of the Co(en)$_3$WO$_4$ crystalline precursor, prepared under near equilibrium conditions by precipitation from solution, necessarily fixes the Co:W ratio at 1:1, which results in WC—23%Co powder after fluid bed conversion. In order to achieve a wider range of WC—Co compositions it is necessary to prepare homogeneous mixtures of Co(en)$_3$WO$_4$ with another source of W, e.g. H$_2$WO$_4$. This can be accomplished by rapid spray drying of mixtures of Co(en)$_3$WO$_4$ (solution A) and H$_2$WO$_4$ in aqueous NH$_4$OH (solution B). For example, the Co/W ratio may be adjusted to the values of 1.0, 0.63, 0.21, and 0.1 by mixing appropriate quantities of solutions A and B. When these solutions are spray dried in a laboratory spray dryer fitted with a 2" rotary atomizer spinning at 35000 rpm; inlet and outlet temperatures 205° and 115° C., respectively; and a starting solution feed rate of 156 ml/min the resulting powders are amorphous or microcrystalline, depending on the Co/W ratio in the starting solution (FIG. 6). After thermochemical conversion (fluidization velocity=100 ft/min, reduction: Ar/10% H$_2$, 2 hr., 700° C., carburization: a$_c$=0.9, 2 hr, 700° C., carburization: a$_c$=0.9, 2 hr, 850° C.) the resulting nanophase WC—Co powders had 23, 15, 6 and 3 weight percent cobalt binder phase, respectively.

Example 3

WC-Co from amorphous AMT-CoCl$_2$ precursor powders.

An alternative precursor solution, which is the preferred embodiment of this invention, involves the use of ammonium metatungstate (AMT) and CoCl$_2$·6H$_2$O or Co(NO$_3$)$_2$·6H$_2$O or Co(CH$_3$COO)$_2$·4H$_2$O. The use of AMT is advantageous because of its high solubility in water and its commercial availability.

Solution C was prepared by dissolving AMT and CoCl$_2$·H$_2$O or Co(NO$_3$)$_2$·6H$_2$O Co(CH$_3$COO)$_2$·4H$_2$O in water. The Co:W ratio was fixed at 0.37, which yields 10% Co in the final WC—Co composite powder.

The starting solution was spray dried in a laboratory spray dryer fitted with a pressure nozzle atomizer (80 PSI). The inlet and outlet temperatures were maintained at a nominal 220° and 130° C. The feed solution was pumped into the dryer at 220 ml/min. SEM micrographs of the dried powder showed spherical particles, which were shown to be amorphous by X-ray diffraction.

Thermochemical conversion of the precursor powder was carried out in a fluid bed reactor (fluidization velocity=60 ft/min, reduction: Ar/10% $H_2$, 2 hr, 700° C., carburization: $a_c$=0.9, 11 hr, 800° C.). The final WC—Co powder particles were pseudomorphic with the precursor powder particles and had a nanoscale microstructure.

The same integrated approach can be applied to the manufacture of other composite systems, as well as single phase materials. For example, laboratory research using a fixed bed reactor has shown the feasibility of synthesizing dispersion strengthened materials (e.g. Cu—2%$Al_2O_3$) , high Tc superconductors (e.g 123—compound), mixed metals (e.g Cu—W), and other materials (e.g. $Co_6W_6C$—Co, $MoO_xC_yN$). A further point, which expands the scope of the process, is that the initial starting solution may also be an emulsion, or a well mixed slurry. For example, a reinforcing phase (e.g. ceramic whiskers) may be incorporated in the precursor solution to produce a whisker reinforced composite powder.

We claim:

1. A spray conversion process for the production of nanophase composition tungsten carbide cobalt powders comprising the steps of:
    a. Preparing and mixing a starting solution consisting essentially of a tungsten compound and a cobalt compound dissolved in a solution;
    b. drying droplets of said solution at a sufficiently rapid rate to form a chemically homogeneous precursor powder;
    c. converting the precursor powder by thermochemical means in the presence of a carburization gas to form a homogeneous nanophase composite tungsten carbide cobalt powder.

2. The process according to claim 1 wherein the drying of the starting solution is achieved by a method selected from the group consisting of spray drying, atomized droplet drying, calcining, roasting, rotary atomization, pressure atomization and ultrasonic atomization.

3. The process according to claim 1 wherein the thermochemical conversion of the precursor powder to the homogeneous nanophase composite powder is achieved in a fluidized bed reactor.

4. The process according to claim 1 wherein the drying of the starting solution is achieved by spray drying and the thermochemical conversion of the precursor powder to the homogeneous nanophase composite powder is achieved in a fluid bed reactor.

5. The process according to claim 1 wherein during the thermochemical conversion step the carburization temperature is in the range 700° C. to 1100° C., the carbon activity is controlled in the range $a_c \approx 0.3$ to 1.0 and the Co/W atomic ratio is in the range 0.1 to 1.5.

6. The process according to claim 5 wherein the drying of the starting solution is achieved by spray drying.

7. The process according to claim 5 wherein the drying of the starting solution is achieved by spray drying and the thermochemical conversion of the precursor powder to the homogeneous nanophase composite powder is achieved in a fluid bed reactor.

8. A spray conversion process for the production of nanophase tungsten carbide-cobalt (WC—Co) comprising the steps of:
    a. preparing and mixing a starting solution comprising ammonium metatungstate and a cobalt containing chemical;
    b. drying the starting solution by atomized-droplet drying at a sufficiently high rate to form a chemically homogeneous precursor powder;
    c. converting the precursor powder by thermochemical means to form homogeneous nanophase WC—Co powder.

9. The process according to claim 8 wherein the cobalt containing chemical is selected from the group consisting of cobalt chloride: $CoCl_2 \cdot 6H_2O$, cobalt nitrate: $Co(NO_3)_2 \cdot 6H_2O$, or cobalt acetate: $Co(CH_3COO)_2 \cdot 4H_2O$.

10. The process according to claim 8 wherein the thermochemical conversion of the precursor powder to the homogeneous nanophase composite powder is achieved in a fluid bed reactor.

11. The process according to claim 11 wherein during the thermochemical conversion step the carburization temperature is in the range 700° C. to 1100° C., the carbon activity is controlled in the range $a_c$=0.3 to 1.0 and the Co/W atomic ratio is in the range 0.1 to 1.5.

* * * * *